United States Patent [19]

Beton

[11] 4,028,986
[45] June 14, 1977

[54] CONNECTOR MEMBER FOR TIP OF FASTENER

[75] Inventor: Richard John Beton, South Blackburn, Australia

[73] Assignee: Olin Corporation, New Haven, Conn.

[22] Filed: Mar. 24, 1976

[21] Appl. No.: 670,032

[52] U.S. Cl. .............................. 85/10 E; 29/526; 29/798
[51] Int. Cl.[2] ................... E04G 3/00; F16B 15/00
[58] Field of Search ............... 85/10 E, 82, 83, 84, 85/80; 269/52, 47, 54.1; 227/154, 147, 140; 248/216

[56] References Cited
UNITED STATES PATENTS

| | | |
|---|---|---|
| 2,438,533 | 3/1948 | Booth .................................. 85/84 |
| 2,761,348 | 9/1956 | Williams et al. .................. 85/10 E |
| 2,961,210 | 11/1960 | Pfaff et al. ..................... 85/10 E X |
| 3,212,388 | 10/1965 | Rosselet .......................... 85/10 E |
| 3,289,522 | 12/1966 | Bell ................................. 85/10 E |

Primary Examiner—Ramon S. Britts
Attorney, Agent, or Firm—William W. Jones; Donald R. Motsko

[57] ABSTRACT

An elastomeric tip member for mounting on the piercing end of a nail-like fastener. The tip member has a forward end having means on its exterior for providing an interference fit with the wall of a hole through a bracket or the like into which the tip member is inserted. The tip member is preferably formed from a plastic material which will break up when the fastener is driven into a supporting material. The tip member thus provides an expendable temporary connection between the fastener and the bracket prior to driving the fastener into a supporting material to secure the bracket thereto.

2 Claims, 5 Drawing Figures

CONNECTOR MEMBER FOR TIP OF FASTENER

The invention refers particularly to a tip member for attachment to the front end portion of a powder actuated fastener and for engagement in an angle bracket, clamp, clip or other member (hereinafter referred to as "bracket"), which is to be fastened to a support member by means of the fastener.

It has been proposed to provide an assembly of: a bracket with an aperture therein; a collar member engaged in the aperture and having a tubular sleeve to receive the fastener and a flange at one end to prevent the collar passing through the aperture in one direction; and a guide sleeve on the fastener to ensure correct location and movement in the barrel of an explosive powered tool.

This construction has several disadvantages and this invention has been devised with the object of providing an improved construction of a member for attachment to the front end of a power actuated fastener and for engagement in the aperture of a bracket. This invention provides a simplified assembly of bracket, fastener and guide means. The invention also provides a construction of a tip member for attachment to the front end of a fastener and engagement with a bracket to be secured in position on a support member wherein the fastener and tip member may be used together in the barrel of a fastener tool.

According to one aspect of the invention there is provided a tip member, for engagement on the front end portion of a powder actuated fastener, having a body portion, the front end part of the body being of a shape and size to fit tightly in an opening in a bracket which is to be secured to a support member. A deflectable peripheral enlargement on the longitudinal surface of the body portion of the tip member is disposed rearwardly of the front end part and has an external variable dimension which permits the tip member to fit slidably in the barrel of an explosive powered tool. The peripheral enlargement is shaped to fit readily into and to slide smoothly in said barrel whilst holding the fastener in position and yet permits the passage of gaseous products of combustion. The tip member also includes a bore through the body portion of a dimension at its rear end to receive tightly the front end portion of a fastener.

In another aspect, the invention provides an assembly of: a bracket having a fixing plate portion with an aperture therein; a tip member engaged firmly in the aperture; and a fastener of the type described engaged in the tip member. The tip member has a front end part to engage tightly in the aperture of the bracket and rearwardly of that front end part a guide portion to fit in the barrel of a powder actuated tool and assist in holding the fastener in correct position and in guiding it in its travel in the barrel. If the bracket is to be attached to a flat surface the fixing plate is flat but, of course, if it is to be attached to a column the fixing plate may be curved to conform to the curvature of the surface to which it is to be attached. For convenience of manufacture the aperture in the bracket is preferably round, and the front end part of the tip member may be of any suitable shape to fit securely therein.

The bracket may, of course, be an angle bracket, or shaped to clamp cables in position, or of any other desired shape and type.

The aligning tip has a front end part which provides a tight fit in the aperture in the bracket so that when the aligning tip is assembled to the bracket the parts will not separate in normal handling.

The bore of the aligning tip may be parallel-sided at the front end for a distance about the same as the enlarged front end part and this portion of the bore is smaller than the remainder. For example, it may be about one-half the diameter of the rear end, or a little smaller or larger, as required. The rear end part of the bore is also parallel-sided and the intermediate part is curved in longitudinal section, or of truncated conical shape, or stepped as required. The rear portion of the bore provides a tight fit on the front end part of a fastener whereby the parts may be assembled and will not separate during normal handling.

In normal assembly the fastener is pressed into the tip until the front end part of the fastener engages the inner end part of the smaller front end of the bore. The front end of the tip member is then pressed into the bracket aperture and is retained therein by friction or interference fit. The assembly is then complete and may be handled in a normal manner without coming apart.

The connecting tip member is preferably made of a material which will shatter or disintegrate when the fastener is driven through it. Polypropolene has been found satisfactory for this purpose. Other plastics materials would also be suitable, as may be other materials.

It is, therefore, an object of this invention to provide a consumable connector for temporarily but firmly interconnecting an elongated nail-like fastener with a bracket which is to be secured to a supporting surface by the fastener.

It is a further object of the invention to provide a connector of the character described which is made of a material which breaks up when the fastener is driven into the supporting surface so as not to interfere with the fastener's ability to secure the bracket to the supporting surface.

It is yet another object of this invention to provide a connector of the character described which may include a variable guide portion to center and guide the fastener in the barrel of a power actuated fastening tool.

It is still a further object of this invention to provide a fastening assembly including a fastener, a bracket, and a connector of the character described.

These and other objects and advantages of the invention will become more readily apparent from the following detailed description of a preferred embodiment of the invention taken in conjunction with the accompanying drawings, in which.

Figure 1:
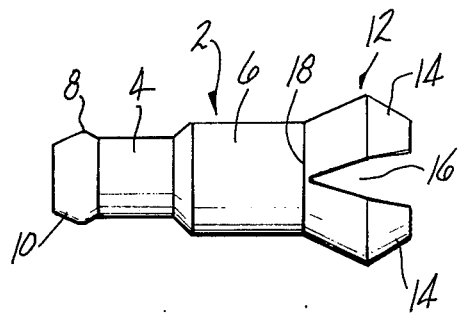
FIG. 1 is a side elevation view of a preferred embodiment of a connecting member made in accordance with this invention.
Figure 2:
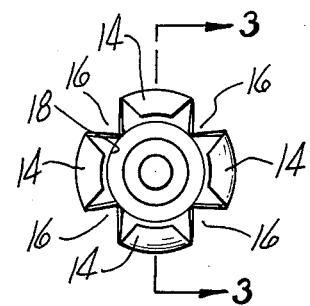
FIG. 2 is a rear end elevation view of the connecting member of FIG. 1 shown rotated 90° about its axis from the position depicted in FIG. 1.

Referring now to the drawings, there is depicted a preferred embodiment of the connector member of this invention and a fastener assembly including the connector. The connector member is designated generally by the numeral 2 and includes a forward nose portion 4 of generally reduced diameter and a main body portion 6 of generally greater diameter. The nose portion 4 is formed with a radially outwardly enlarged circumferential rib 8 near its forward end, and the outer surface of the nose 4 forward of the rib 8 is tapered forwardly and inwardly, as at 10. In the depicted embodiment of the connector 2 there is provided a rearward tail section 12 containing a plurality of outwardly extending wings 14. There are preferably three or four wings 14 in the tail section 12 which are circumferentially offset from each other by intervening V-shaped slots 16. The wings 14 are relatively thin walled and are hingedly connected to the remainder of the connector 2 along a circumferential hinge line 18. The function of the wings 14 will be detailed hereinafter.

Figure 3:
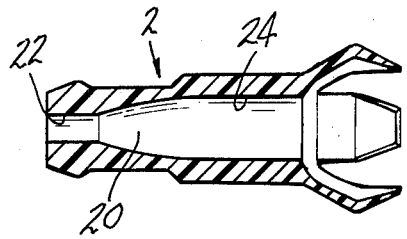
FIG. 3 is an axial sectional view of the connecting member taken along line 3—3 of FIG. 2.

The internal construction of the connector 2 is shown in FIG. 3. It will be noted that there is an axial through bore 20 formed in the member 2. The bore 20 preferably includes a forward cylindrical portion 22 of reduced diameter, and a remaining portion 24 of tapering diameter which expands in the rearward direction.

Figure 4:
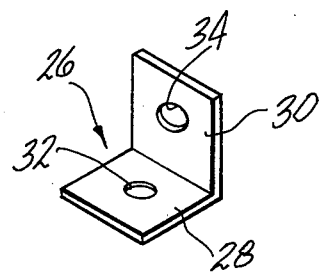
FIG. 4 is a perspective view of one type of bracket to which the connecting member can be attached.

FIG. 4 shows a typical bracket 26 with which the connector 2 can be used and which forms a component of the fastener assembly of this invention. The bracket 26 includes a pair of angularly offset legs 28 and 30, each of which is provided with a through aperture 32 and 34 respectively. This bracket is commonly called an angle bracket, however, it will be readily understood that the connector 2 could be used with any number of common types of brackets, such as pipe brackets, hanger brackets, electrical wiring brackets, or the like.

The fastener assembly is put together by inserting the pointed end of an elongated nail-like fastener 36 into the tapered bore 24 of the connector 2 to tightly unite the connector 2 and fastener 36. The point of the fastener 36 will be located in the cylindrical bore 22 but will not usually protrude from the forward end of the connector. The nose 4 of the connector 2 is then pushed through the appropriately sized bracket aperture 32 or 34 until the rib 8 is contained within or has passed through the bracket aperture. The taper 10 makes easier insertion of the connector nose 4 into the bracket aperture. It will be understood that the natural resiliency of the connector material will serve to frictionally hold the rib 8 in the bracket aperture or will enable the rib 8 to pass completely through the bracket aperture, at which time the rib 8 will rebound to hold the connector 2 and bracket 26 tightly together.

Figure 5:
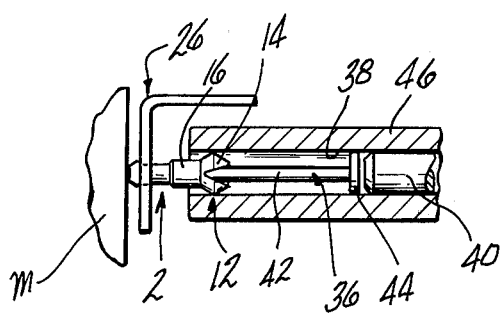
FIG. 5 is a fragmented view partly in section of the muzzle end of a power-actuated fastening tool showing positioning of the fastener assembly prior to driving into a supporting material.

Referring to FIG. 5, the manner in which the fastener assembly is aligned in a power actuated tool prior to being set in a supporting material M. The barrel of the tool is designated by the numeral 46 and its bore is 38. The tool shown is a piston tool and the piston is numeral 40. The fastener 36 has its shank 42 telescoped into the connector bore 24 and has a rearward head 44 which is somewhat smaller than the diameter of the barrel bore 38. The fastener head 44 provides a striking surface for the tool piston 40 and serves to center and guide the rear end of the fastener assembly in the barrel bore 38. The tail portion 12 of the connector 2 is positioned within the barrel bore 38, and the barrel bore diameter is such that the wings 14 are inwardly deflected when they engage the barrel bore 38. The inherent resiliency of the connector wings 14 causes them to be biased outwardly against the barrel bore 38 to center and guide the front end of the fastener assembly in the barrel bore. It will be appreciated that the provision of deflectable wings 14 on the tail portion 12 of the connector member 2 provides some versatility to the connector member in that it can be used to center and guide a fastener assembly in a number of different size barrel bore diameters. It will also be appreciated that the tail portion 12 can be eliminated altogether, and the body portion 6 diameter can be custom sized to mate with any known barrel bore diameter. A slightly less versatile connector is formed in that manner.

It will be readily appreciated that this invention provides an expendable connector useful for producing fastener assemblies, wherein the connector is shattered or destroyed when the fastener assembly is driven into a supporting material. The fastener assembly has provision for centering the fastener while in the tool barrel bore, and, in a preferred embodiment, can be used with a variety of bore diameters. The connector is inexpensive to manufacture and can be molded from suitable plastic material.

Since many changes and variations of the disclosed embodiment of the invention may be made without departing from the inventive concept, it is not intended to limit the invention otherwise than as required by the appended claims.

What is claimed is:

1. A disintegrating connector member for use in providing a temporary connection between an elongated fastener shank and a bracket having at least one aperture therethrough, said member comprising: an axially elongated body formed from an elastically deformable material, said body having a forward nose portion sized to engage the bracket aperture for retention of the bracket on the connector member, a bore extending axially of the body sized to snugly receive and retain the fastener shank therein, and a rearward part of said body being formed with a plurality of radially outwardly and rearwardly extending wings which are radially deflectable to provide means for snugly engaging a plurality of different diameter bores, said wings being joined to said body along a circumferential hinge line to facilitate said radial deflection, each of said wings being separated from the adjacent wings by intervening substantially V-shaped slots.

2. In combination with the connector member of claim 1: a fastener having an elongated shank disposed in and frictionally engaged by said body bore; and a bracket mounted and retained on said body nose portion.

* * * * *